(12) United States Patent
Tailpied

(10) Patent No.: US 9,751,195 B2
(45) Date of Patent: Sep. 5, 2017

(54) TOOL FOR LOOSENING A CONNECTING NUT OF A ROTOR OF A MODULE FOR A GAS-TURBINE ENGINE

(71) Applicant: SNECMA, Paris (FR)

(72) Inventor: Fabrice Tailpied, Verneuil sur Seine (FR)

(73) Assignee: SNECMA, Paris (FR)

( * ) Notice: Subject to any disclaimer, the term of this patent is extended or adjusted under 35 U.S.C. 154(b) by 337 days.

(21) Appl. No.: 14/396,889

(22) PCT Filed: May 2, 2013

(86) PCT No.: PCT/FR2013/050976
§ 371 (c)(1),
(2) Date: Oct. 24, 2014

(87) PCT Pub. No.: WO2013/164549
PCT Pub. Date: Nov. 7, 2013

(65) Prior Publication Data
US 2015/0068367 A1    Mar. 12, 2015

(30) Foreign Application Priority Data
May 2, 2012  (FR) ...................................... 12 54027

(51) Int. Cl.
*B25B 13/48*     (2006.01)
*B25B 13/10*     (2006.01)
(Continued)

(52) U.S. Cl.
CPC .............. *B25B 13/48* (2013.01); *B25B 13/10* (2013.01); *B25B 13/105* (2013.01);
(Continued)

(58) Field of Classification Search
CPC ....... B25B 13/10; B25B 13/48; B25B 13/105; B25B 21/002; F02C 7/20; F01D 25/285; F05D 2230/70
(Continued)

(56) References Cited

U.S. PATENT DOCUMENTS

| 877,773 A | * | 1/1908 | Holm ...................... B25B 13/44 |
| | | | 269/109 |
| 2,052,458 A | * | 8/1936 | Gustave ................... B67B 7/18 |
| | | | 294/34 |

(Continued)

FOREIGN PATENT DOCUMENTS

| EP | 0 987 457 | 3/2000 |
| FR | 2 857 708 | 1/2005 |
| FR | 2 963 062 | 1/2012 |

OTHER PUBLICATIONS

International Search Report Issued Jun. 26, 2013 in PCT/FR13/050976 Filed May 2, 2013.

*Primary Examiner* — Hadi Shakeri
(74) *Attorney, Agent, or Firm* — Oblon, McClelland, Maier & Neustadt, L.L.P.

(57) ABSTRACT

A tool and method for loosening, for example, a nut connecting an HP rotor to an intermediate housing of a twin-shaft turbojet engine and forward fan including an LP turbine module, an HP module with an upstream journal of the HP rotor, and an intermediate housing with a support bearing of the HP rotor journal. The journal is held in the bearing by the connecting nut. The method includes inserting the tool for loosening the connecting nut after having cleared access to the nut. The loosening tool includes a tube and a plurality of fingers retractable between a position in which they are housed in the tube and a position in which they are deployed radially. The tool is installed with the retractable fingers deployed and in contact with all of teeth of the nut, and an unscrewing rotational torque is then applied to the tool.

4 Claims, 4 Drawing Sheets

(51) Int. Cl.
  *F01D 25/28* (2006.01)
  *F02C 7/20* (2006.01)
  *B25B 21/00* (2006.01)

(52) U.S. Cl.
  CPC .......... *B25B 21/002* (2013.01); *F01D 25/285* (2013.01); *F02C 7/20* (2013.01); *F05D 2230/70* (2013.01)

(58) Field of Classification Search
  USPC .................................................. 81/129, 91.3
  See application file for complete search history.

(56) References Cited

U.S. PATENT DOCUMENTS

| | | | |
|---|---|---|---|
| 2,476,608 A * | 7/1949 | Kinsey | B25B 13/44 |
| | | | 81/443 |
| 2,852,652 A | 9/1958 | Rose et al. | |
| 6,338,578 B1 | 1/2002 | Adde et al. | |
| 7,128,529 B2 * | 10/2006 | Le Jeune | F01D 5/025 |
| | | | 415/229 |
| 8,833,209 B2 * | 9/2014 | Brown | B25B 13/10 |
| | | | 81/90.1 |
| 2005/0013696 A1 | 1/2005 | Le Jeune et al. | |
| 2011/0031707 A1 * | 2/2011 | Chen | B23P 11/027 |
| | | | 279/142 |
| 2012/0020774 A1 | 1/2012 | Bart et al. | |

\* cited by examiner

TOOL FOR LOOSENING A CONNECTING NUT OF A ROTOR OF A MODULE FOR A GAS-TURBINE ENGINE

FIELD OF THE INVENTION

The present invention relates to the dismantling of a gas-turbine engine, particularly to the removal of the connecting nut that connects to a bearing of the high-pressure rotor in a twin-screw front-fan turbofan engine. The invention more particularly relates to the tool for removing the connecting nut.

PRIOR ART

A twin-screw, front-fan turbofan engine comprises two coaxial rotors supported by bearings housed in the hubs of two structural casing elements: referred to in the art as the intermediate casing and the exhaust casing. At the front of the engine, the bearings are housed in the intermediate casing and, at the rear, one or more bearings are housed in the exhaust casing. In an engine such as the CFM56, the rotary assemblies are thus mounted on five bearings: three at the front and two at the rear. At the front, the fan shaft and the shaft of the low-pressure (LP) rotor are mounted respectively in the two first bearings. The high-pressure (HP) rotor is supported by bearing No. 3, downstream of the first two. At the rear, this same HP rotor is supported by an inter-shaft bearing and the shaft of the LP rotor is supported by a bearing mounted in the hub of the exhaust casing.

After a period of operation, each engine is sent to the workshop for example for a complete overhaul, in which it is entirely dismantled and each part is cleaned, repaired or even replaced if necessary. Dismantling comprises several steps, including that of removing the LP turbine module at the rear and then the module formed by the HP spool. The rotor of the HP spool comprises an upstream journal which is retained in bearing No. 3 by a connecting nut which must be unscrewed. This operation prevents a certain degree of difficulty in itself because of the central position of the nut in the engine and the poor accessibility of this component. The connecting nut is a threaded cylindrical component which serves to immobilize the journal-shaped upstream end of the HP rotor with respect to the inner ring of the ball bearing assembly. This nut comprises four teeth cut into the cylindrical wall and situated in the upstream extension of the threaded part.

The standard procedure involves removing the LP turbine module at the rear and extracting the LP shaft likewise from the rear. The connecting nut is accessed via the central passage left free by the LP shaft. After a wedging device, which takes the place of the bearing that has been removed, and a tool-guiding tube have been fitted, a tool of suitable shape, provided with two retractable lugs at the end of a cylindrical tube, is introduced into this passage as far as the nut, then the two lugs are deployed radially so that they engage against two of the four teeth of the nut. Because the HP rotor is prevented from rotating by a wedge, turning the tool about its axis allows the nut to be unscrewed.

This operation is a delicate one in as much as the teeth of the connecting nut must not be damaged, nor must this nut be deformed. To that end, the instructions by the engine manufacturer prescribe a maximum torque to be applied.

If the nut cannot be unscrewed in this way, the procedure then consists in removing the assembly consisting of the fan and the low-pressure compressor in order to gain access to the connecting nut from the front of the engine. Once this access is available, a tool of appropriate shape is introduced along the axis of the engine until it reaches the nut. The head of the tool is tailored to the shape of the set of teeth of the nut and that means that a larger torque than before can be applied, thereby increasing the chances of succeeding in loosening the nut.

However, if the connecting nut still cannot be removed using this operation, it then has to be cut. Cutting the nut is not an inexpensive or straightforward solution and is to be avoided because not only does the nut then have to be replaced but there is a risk that the chips and filings produced may contaminate the gearing located in the immediate vicinity, and this would means having to remove and clean these components. This gearing, known as the IGB, serves to drive the radial arm connected to the accessory gearbox, AGB.

With increasing engine operating duration or number of engine operating cycles, and the use of such engines, where relevant, in aggressive environments, it is found that dismantling now increasingly leads to the nut having to be cut because it has become seized.

Seizure of the connecting nut is due to multiple factors:
coking of the grease resulting from the heating-up of the component;
deformation of the nut during loosening, due to the torsion forces generated by the permitted torque limit being exceeded,
oxidation of those parts of the nut that form the centring tracks with the journal and the inner rings of the rolling bearing.

The present applicant has set itself the objective of developing a tool for dismantling an engine, avoiding as far as possible the need to resort to cutting the nut.

SUMMARY OF THE INVENTION

The present invention relates to a twin-screw bypass turbofan engine. It comprises a front fan, an intermediate casing, an HP module with an HP rotor, and an LP turbine module. As the intermediate casing has a bearing supporting the HP rotor, the latter is held in the bearing by a connecting nut. The method for dismantling the engine involves a step of introducing a tool for unscrewing the connecting nut after having created access to the nut, and a step of heating the nut beforehand before introducing the unscrewing tool.

Heating beforehand to a modest temperature makes it possible to soften the coked oils that are sticking together the screw thread of the nut and that of the journal and also makes it possible to allow differential expansion of the cylindrical elements in contact with one another, the bearing surfaces of which are designed to be a close fit. The temperature is kept below a safety limit to safeguard the integrity of the components involved. The maximum temperature heated to in one exemplary embodiment of the method is 130° C.

Once the nut has been heated, a rear unscrewing tool is introduced via the passage made free by the LP turbine module.

The invention relates to the unscrewing of the nut connecting the HP rotor to the intermediate casing from the rear of the engine. The method uses an unscrewing tool comprising a tube and a plurality of fingers that are retractable between a position in which they are housed in the tube and a position in which they are radially deployed. The said tool is introduced in such a way that the retractable fingers are deployed to come into lateral contact with all the teeth of the nut and that an unscrewing torque is applied to the tool.

An unscrewing torque is applied to the tool notably in such a way that the torque is kept at a value below the value at which the loads on the teeth of the connecting nut carry a risk of damaging them. Because the load is spread across all of the teeth, it thus becomes possible to increase the torque applied to the nut, without the risk either of deforming the teeth or of ovalising the cylindrical component because load is concentrated in two diametrically opposite zones.

The invention relates to the unscrewing tool; it comprises a tubular element provided for the plurality of fingers, which are able to move radially between a position in which they are retracted inside the tubular element and a position in which they are deployed and able to come into contact laterally with the teeth of the connecting nut.

According to one preferred embodiment, the tubular element comprises a disc that is transverse, able to move in rotation with respect to the tubular element and with radial grooves for guiding fingers, and a mechanism for actuating the fingers with respect to the transverse disc.

More particularly, the tool also comprises a mechanism for actuating the fingers with a central member, able to move in rotation with respect to the mobile disc, connected by link rods to the fingers, the rotation of the central member causing the fingers to move radially with respect to the mobile disc.

In order to immobilize the tubular element and allow an unscrewing torque to be applied to the tool, the tubular element comprises a rotation-proofing brake in the vicinity of the disc supporting the fingers. The tubular element comprises vanes able to move radially outwards about axes perpendicular to the axis of the tubular element.

According to another feature, the tool comprises an axial wedging and locating means formed of stops projecting from a transverse plate.

BRIEF DESCRIPTION OF THE FIGURES

The method for removing the connecting nut according to one implementation given by way of nonlimiting example is now described in greater detail, the description being given with reference to the attached drawings in which:

FIG. 7 being a view in section on VII-VII of FIG. 6.

DETAILED DESCRIPTION OF THE INVENTION

Figure 1:
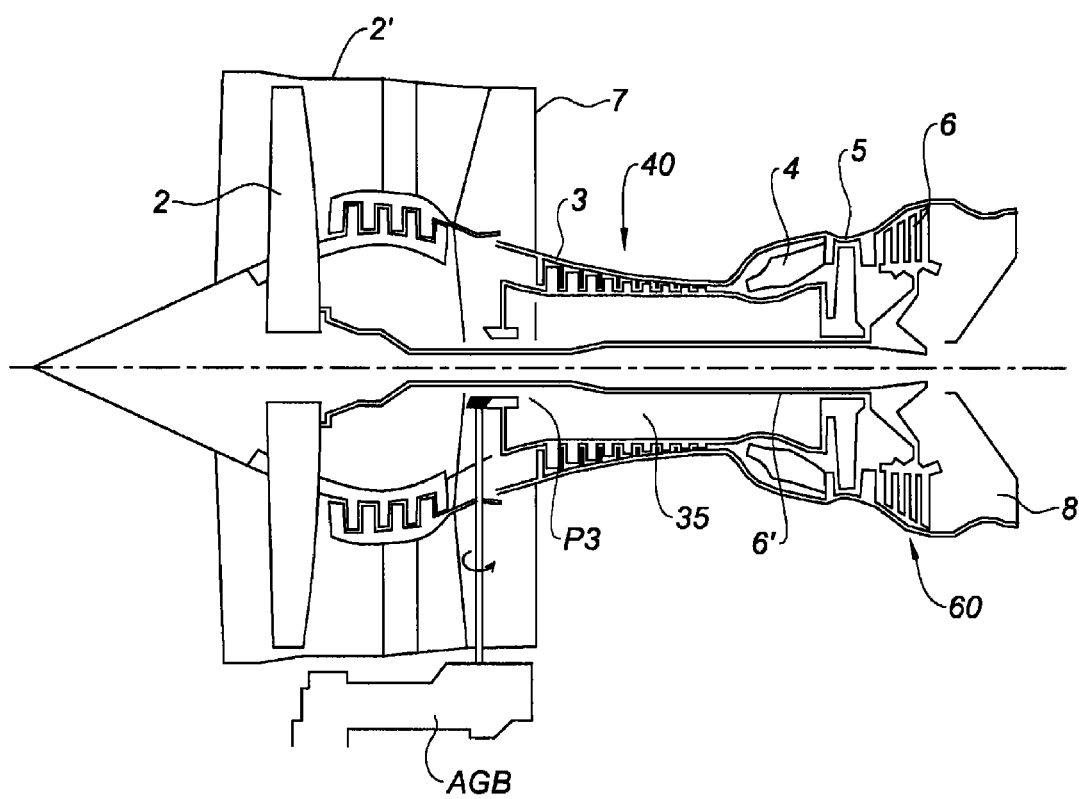
FIG. 1 is a depiction in axial section of an engine to which the method applies.

The cross section that is FIG. 1 depicts a twin-screw front-fan turbofan engine 1. From right to left in the figure, namely from upstream to downstream in the direction in which the gases flow, there can be seen the fan rotor 2 inside the fan casing 2'. The fan duct delimited by the casing splits into two concentric annular ducts, one for the primary flow passing through the engine and the other for the secondary or bypass flow which is ejected without being heated. The primary flow is compressed in the low-pressure boost compressor then in the HP compressor 3. It is admitted into the combustion chamber 4 where it is heated by the burning of the fuel. The resulting hot gases are distributed successively through the HP turbine 5 and the LP turbine 6 before being ejected. The rotors are supported in the two structural casings that are the intermediate casing 7—to which the fan casing is fixed at the upstream end—and the exhaust casing 8 at the rear.

The fan 2 with the boost compressor and the LP turbine 6 are connected by an LP turbine shaft 6'. The turbine shaft 6' and the turbine 6 with its casing form, together with the exhaust casing 8, the LP turbine module 60.

The HP compressor 3 and the HP turbine 5 form the HP rotor 35 inside the HP spool or module 40. That also comprises the combustion chamber 4. The HP rotor 35 is mounted upstream in the bearing P3 which is supported in the hub of the intermediate casing 7. This too is where the gearbox, referred to as the IGB, for driving the accessories gearbox AGB via a radial shaft housed in an arm of the intermediate casing, is located.

Figure 2:
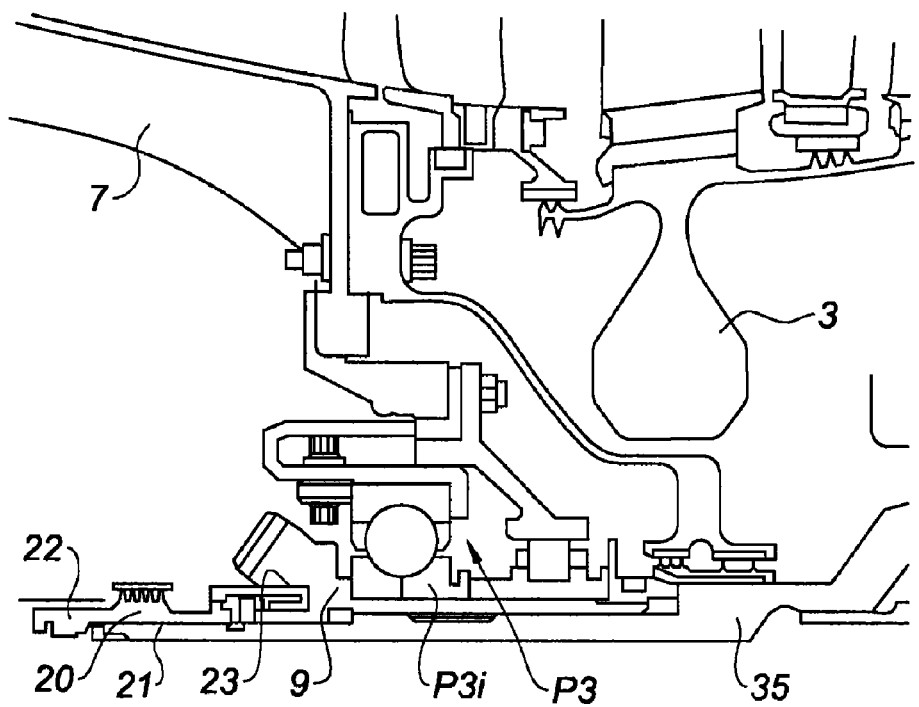
FIG. 2 is a half axial section showing the nut connecting to the bearing of the HP rotor and that is to be removed, in situ.

FIG. 2 shows this part of the engine in greater detail; the upstream end of the rotor 35, formed as a journal, is housed in the inner ring P3$i$ of the rolling bearing P3. The cylindrical part of the pinion 9 of the IGB gearbox is interposed between the HP rotor and the ring P3$i$. The connecting nut 20 is screwed at 21 onto the end of the rotor 35 and axially immobilizes the latter with respect to the intermediate casing. The connecting nut 20 is thus a cylindrical component with an internal screw thread 21, an external centring track 23 and teeth 22 in the upstream axial extension of the cylindrical wall thereof. The nut comprises four teeth distributed about its axis.

Figure 3:
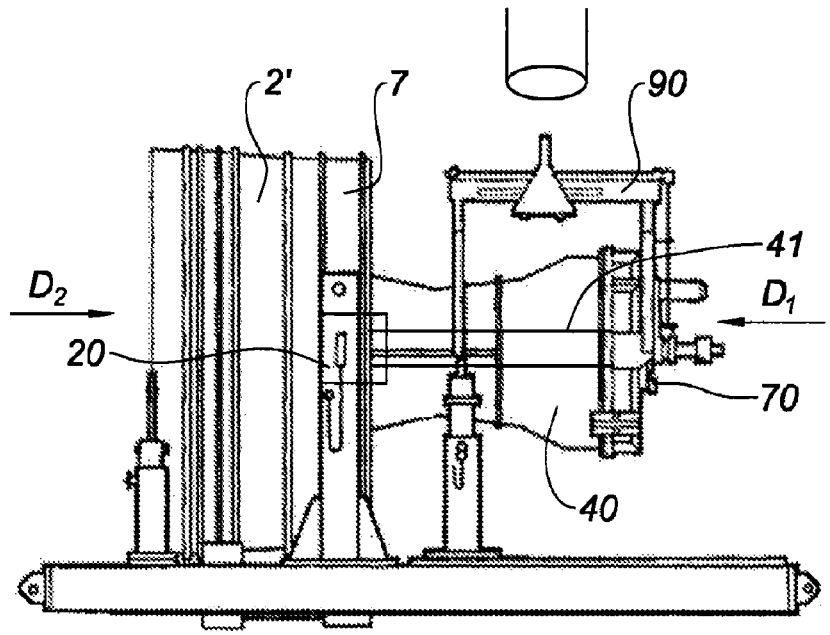
FIG. 3 is a schematic side view of the engine during the process of dismantling.
Figure 4:
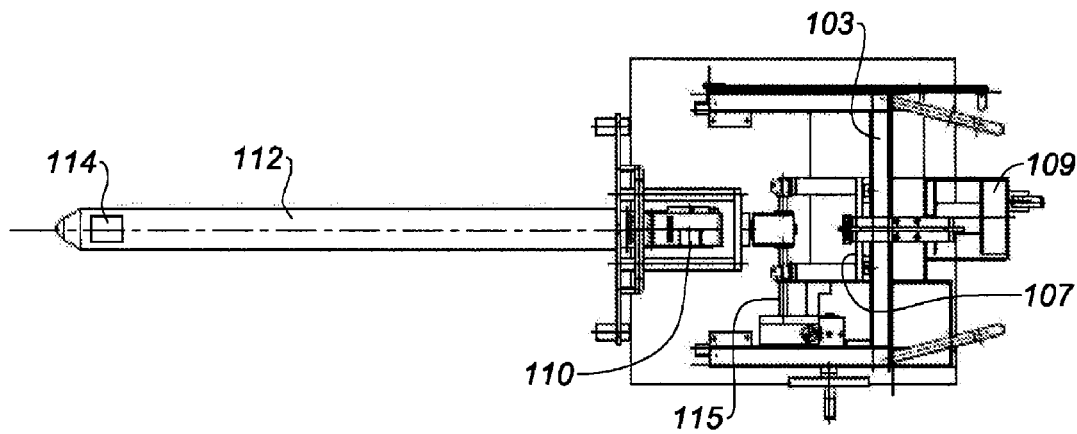
FIGS. 4 and 5 depict one exemplary embodiment of the device for heating the nut.
Figure 5:
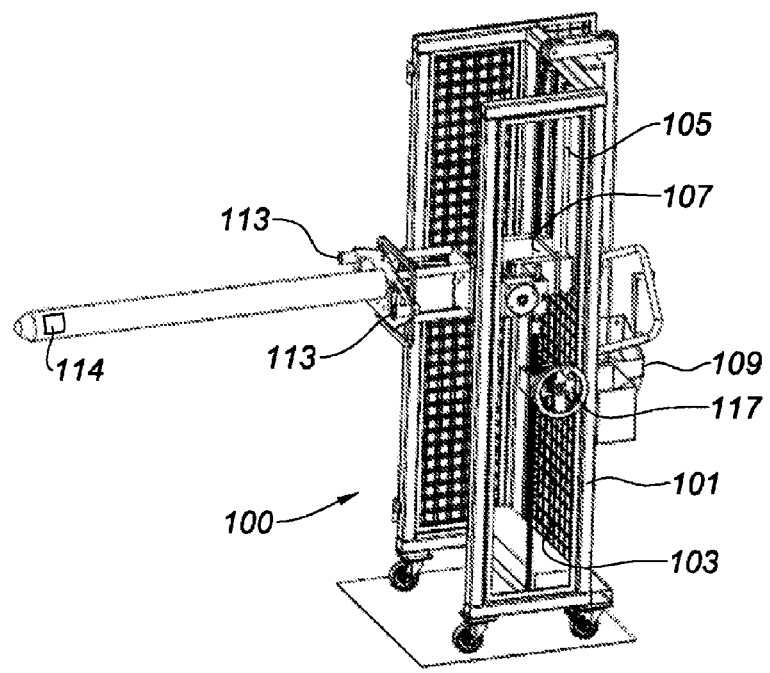

The dismantling of the HP module 40 involves removing the LP module 60 beforehand in order to gain access to the nut 20 and fitting a disc 70 for the retaining of the HP rotor in its casing. This disc takes the place of the downstream inter-shaft bearing which has been removed with the LP module 60. The state of the engine is depicted schematically in FIG. 3. The front, fan casing and intermediate casing, is fixed to a stand and the rear part that is to be detached from the intermediate casing is the HP module 40. It is attached to a beam 90 suspended from a pulley block.

The next step is to introduce the means 100 of heating the nut 20 into the guide tube 41 fitted in the central space left free by the LP turbine shaft.

This means 100 is described hereinafter.

It comprises a carriage 101 mounted on rollers and with a vertical wall 103, provided with vertical rails 105 guiding a vertically mobile platform 107. The platform is suspended from a line and is connected by a set of pulleys to a manually operated hoist 109 that allows the height thereof to be adjusted. The platform 107 supports the heating assembly made up of a heater 110 and of a hollow tube 112. The heater is positioned at the proximal end of the tube in order to produce in the hollow tube 112 a stream of hot air directed towards its other end. This other end is open laterally with apertures 114 cut into the wall of the tube 112 about the axis thereof. The heating assembly also comprises a means for wedging and locating the tube in terms of position when introduced into the engine. This means here is formed of two projections 113 on a transverse plate which collaborate with corresponding notches formed on the retaining disc 70.

The heating assembly is mounted on the platform by a horizontal rotation spindle 115 so that it can be oriented into a vertical storage position in which it is retracted into the carriage, or alternatively into a horizontal active position. The position of the heating assembly is controlled by a hand wheel 116 positioned laterally on the carriage. A suitable mechanism transmits the rotational movement of the hand wheel to the rotating of the heating assembly about the horizontal spindle 115.

In order to heat the connecting nut 20, the carriage is positioned facing the engine along the axis thereof. The heating element is brought horizontal and introduced into the guide tube 41 until the projections 113 come into abutment in their respective housings formed in the retaining disc 70. The end of the tube is then at the height of the nut. The heater is switched on and hot air is blown through the apertures 114 in the tube towards the nut. The increase in temperature of the nut is monitored; it must not exceed 130° C. When the temperature is reached, the heater is deactivated and the carriage is withdrawn and put away.

The second step is to unscrew the connecting nut with the tool 200 inserted from the turbine, at the rear, into the guide tube 41. To do that, use is made of an unscrewing tool comprising an unscrewing tube at the end of which are mounted four fingers that can be retracted between a position retracted inside the said tube allowing the tube to move along the internal tubular space 41, and a deployed position in which they extend radially out from the cylindrical wall of the unscrewing tube. In the latter position and by applying a torque about the axis of the tube, the four fingers press against a lateral edge of each tooth and transmit screwing forces to them. By providing a number of fingers that is equal to the number of the teeth of the nut, it is possible to obtain better distribution of force than can be achieved with just two fingers. It then follows that it becomes possible to allow a higher torque to be applied, thereby increasing the chances of succeeding in freeing the nut.

Figure 6:
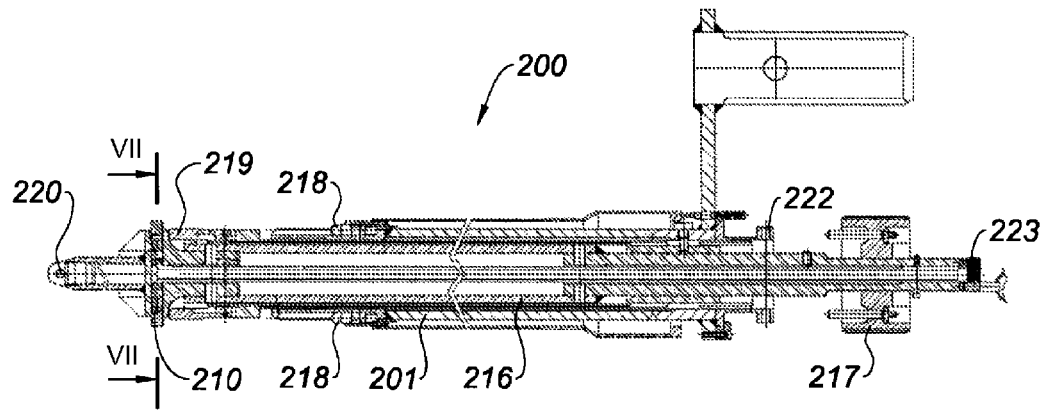
FIGS. 6, 7 and 8 depict one exemplary embodiment of the device for unscrewing the nut, introduced from the rear, the turbine side.
Figure 7:
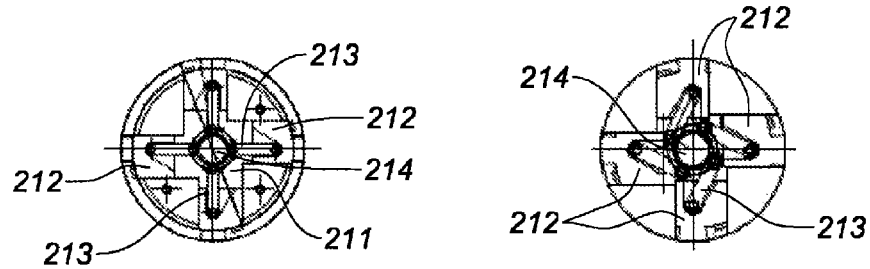
Figure 8:
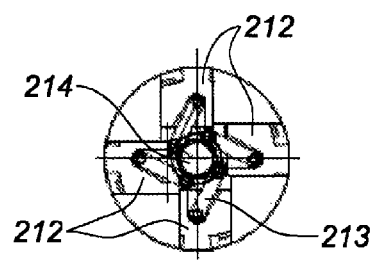
Figure 9:
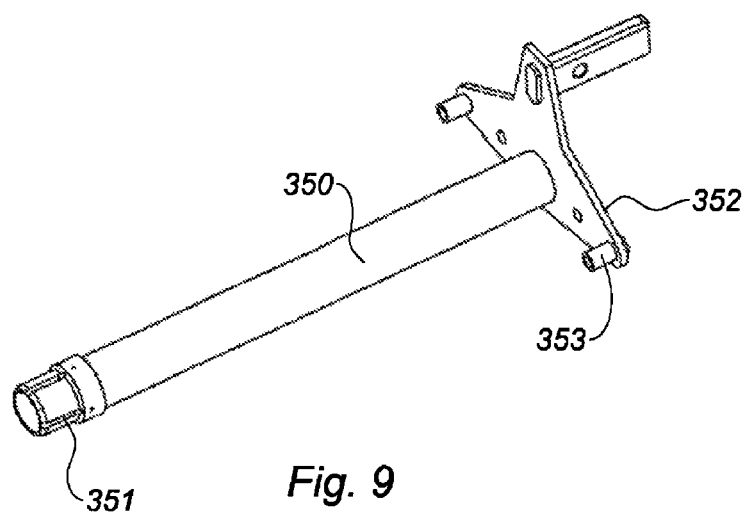
FIG. 9 is an isometric view of the tool that blocks the rotation of the HP rotor.

Reference is now made to FIGS. 6 to 8 which are cross sections of a tool suited to the method. FIG. 6 depicts the tool in longitudinal section. FIG. 7 is a cross section on VII-VII of FIG. 6, with the fingers deployed. FIG. 8 is the same view but with the fingers retracted. This tool 200 comprises a tubular element 201 in which it houses the mechanism that deploys and then retracts the fingers into and out of from contact with the tooth of the nut.

The finger actuation mechanism comprises a disc 210 positioned across the tube at the end thereof; the disc has four radial grooves 211 in a cross shape for individually housing the fingers 212. The latter are connected to link rods 213 articulated to an actuating member 214, as can be seen in FIGS. 7 and 8 for two positions of the fingers. By turning the actuating member on itself about its axis, in one direction or the other, the link rod makes the fingers adopt a retracted or deployed position, depending on the direction. The disc 210 is secured to a tubular element 216 surrounding the finger actuating member 214. The tubular element 216 is secured to a gearwheel 217 for driving the rotation thereof. The tubular element 201 is designed to be rendered immobile with respect to the HP module 40. For this purpose it comprises projections, not depicted here and like in the nut heating means 100, which collaborate with the retaining disc 70. At its other end, the tube is provided with pins 218 which are intended to engage in grooves of the HP rotor journal with a view to contributing to preventing any rotation of the HP rotor 35 while the loosening torque is being applied to the nut. The tube 201 is finally associated with radially mobile vanes 219, actuated by the hand wheel 222, used to extract, prior to loosening, the brake that prevents the nut 20 from rotating.

An upstream guide member 220 is also depicted in this figure. Its diameter is smaller than that of the tube 201 and it centres the tool 200 via a tool provided for this purpose and mounted on the fan 2. After the nut has been heated, the tool is introduced into the central space until the lateral projections, not depicted, come into abutment against the device 70. The disc then faces the teeth of the nut. The fingers are then deployed radially by a determined angular rotation of the control member 223. As one or more fingers 212 have a lateral aileron, the disc is made to turn so that the ailerons slide in the corresponding grooves made under the teeth.

When the tool is in abutment it is known that at the upstream end of the tube, which is not visible from the rear, the axial pins 218 are engaged in the corresponding axial grooves of the inside of the journal of the HP rotor 35. With everything wedged and in position, a torque multiplier such as the one known as a Sweeney torque multiplier, is fitted.

A breaking torque wrench, calibrated to the maximum permissible torque, is used to check whether the nut has seized. If the wrench yields and breaks, that means that the maximum permissible torque has been exceeded and the nut is considered to be stuck. Attempts must therefore be made to unscrew it from the front.

If the wrench does not break and allows the nut to be loosened, a motor, for example a compressed air motor, is fitted to the torque multiplier and the nut is loosened then unscrewed.

If the nut cannot be loosened because it has seized, it is unscrewed from the front. The method for removing the connecting nut from the front involves first of all removing the assembly formed by the fan, the boost compressor and the bearings P1 and P2 in order to have a direct line of sight to the nut, from the front.

The invention claimed is:

1. A tool for unscrewing a connecting nut in a rotor of a gas-turbine engine module, comprising:
   a tubular element including a plurality of fingers, which are moveable radially between a first position in which radially outer free ends of the fingers are retracted radially inward inside the tubular element and a second position in which the radially outer free ends of the fingers are deployed radially outward and are configured to come into contact laterally with teeth of the connecting nut;
   a disc that is transverse and is configured to move in rotation with respect to the tubular element and with radial grooves for guiding the fingers;
   an actuating mechanism for actuating the fingers with respect to the disc;
   an external tube which houses the tubular element and the actuating mechanism; and
   axially extending pins provided on the external tube for engaging in grooves of a rotor journal.

2. A tool according to claim 1, wherein the actuating mechanism comprises a central member, configured to move in rotation with respect to the disc, connected by link rods to the fingers, the rotation of the central member causing the fingers to move radially with respect to the mobile disc.

3. A tool according to claim 1, further comprising an upstream guide member at a free end of the tool.

4. A tool according to claim 1, wherein at least one of the fingers includes a lateral aileron.

* * * * *